United States Patent
Sato et al.

(10) Patent No.: US 10,767,065 B2
(45) Date of Patent: Sep. 8, 2020

(54) NON-AQUEOUS INKJET INK COMPOSITION

(71) Applicant: SAKATA INX CORPORATION, Osaka-shi, Osaka (JP)

(72) Inventors: Yoichi Sato, Osaka (JP); Okinori Nakashima, Osaka (JP); Yoshiyuki Aoki, Osaka (JP); Jun Kinjyo, Osaka (JP); Takuya Okamoto, Osaka (JP)

(73) Assignee: SAKATA INX CORPORATION, Osaka (JP)

(*) Notice: Subject to any disclaimer, the term of this patent is extended or adjusted under 35 U.S.C. 154(b) by 315 days.

(21) Appl. No.: 15/748,610

(22) PCT Filed: Jun. 1, 2016

(86) PCT No.: PCT/JP2016/066141
§ 371 (c)(1),
(2) Date: Jan. 29, 2018

(87) PCT Pub. No.: WO2017/018050
PCT Pub. Date: Feb. 2, 2017

(65) Prior Publication Data
US 2018/0327620 A1    Nov. 15, 2018

(30) Foreign Application Priority Data
Jul. 30, 2015   (JP) ................. 2015-150524

(51) Int. Cl.
| C09D 11/00 | (2014.01) |
| C09D 11/36 | (2014.01) |
| C09D 11/322 | (2014.01) |
| B41M 5/00 | (2006.01) |
| C09D 11/107 | (2014.01) |
| C09D 1/00 | (2006.01) |
| C09D 4/00 | (2006.01) |
| C09D 5/00 | (2006.01) |
| C09K 3/00 | (2006.01) |

(52) U.S. Cl.
CPC ............. *C09D 11/36* (2013.01); *B41M 5/00* (2013.01); *C09D 11/107* (2013.01); *C09D 11/322* (2013.01)

(58) Field of Classification Search
USPC ........... 106/31.01, 31.13, 31.6, 31.85, 31.86
See application file for complete search history.

(56) References Cited

U.S. PATENT DOCUMENTS 6,794,425 B1 * 9/2004 Ellis .................. C09D 11/326
523/160
2008/0119593 A1   5/2008 Stramel et al.
2011/0288228 A1 * 11/2011 Muto .................. C09D 11/328
524/523
2016/0194508 A1   7/2016 Yodo et al.
2016/0222229 A1   8/2016 Yamada et al.

FOREIGN PATENT DOCUMENTS

| CN | 102300942 A | 12/2011 |
| GB | 2400371 A | 10/2004 |
| JP | S60118767 A | 6/1985 |
| JP | 2005200469 A | 7/2005 |
| JP | 2011052162 A | 3/2011 |
| JP | 2014095079 A | * 5/2014 |
| JP | 2014095079 A | 5/2014 |
| JP | 2014218537 A | 11/2014 |
| JP | 2015007206 A | * 1/2015 |
| JP | 2015007206 A | 1/2015 |
| WO | 2007072804 A1 | 6/2007 |
| WO | 2015020128 A1 | 2/2015 |
| WO | 2015050219 A1 | 4/2015 |

OTHER PUBLICATIONS

International Search Report (ISR) dated Jul. 19, 2016, issued for International application No. PCT/JP2016/066141.
A Notification of Reasons for Refusal issued by the Japanese Patent Office, dated May 14, 2019, for related Japanese application No. 2015-150524. (5 pages).
Extended European Search Report (EESR) dated Apr. 4, 2019, issued for European counterpart patent application No. EP16830155.4 (6 pages).
Notification Concerning Transmittal of International Preliminary Report on Patentability (PCT/IB326) and Notification of Transmittal of Translation of the International Preliminary Report on Patentability (PCT/IB338) dated Feb. 8, 2018, with International Preliminary Report on Patentability (PCT/IB/373) and Written Opinion of the International Searching Authority (PCT/ISA/237), for corresponding international application PCT/JP2016/066141.
A First Office Action issued by the State Intellectual Property Office of China dated May 11, 2020 for Chinese counterpart application No. 201680044494.0 (7 pages).

* cited by examiner

Primary Examiner — James E McDonough
(74) Attorney, Agent, or Firm — Law Office of Katsuhiro Arai

(57) ABSTRACT

An object is to provide a non-aqueous inkjet ink composition offering excellent wettability, fixing property, solid-fill property, anti-mottling property, as well as discharge stability, even when printed at high speed on a matter to be printed whose printing side is constituted by a polyvinyl chloride or ethylene-vinyl acetate copolymer or other vinyl polymer, etc. As means for achieving the object, a non-aqueous inkjet ink composition containing an acrylic resin, a pigment, a pigment dispersant, and an organic solvent, is provided, wherein such non-aqueous inkjet ink composition is characterized by containing, as the organic solvent, a propylene carbonate and a diethylene glycol dialkyl ether, wherein the propylene carbonate is compounded by 5 to 25 percent by mass in the ink composition, while the diethylene glycol dialkyl ether is compounded in a manner providing a ratio of diethylene glycol dialkyl ether/propylene carbonate falls in a range of 3 to 8.

2 Claims, No Drawings

NON-AQUEOUS INKJET INK COMPOSITION

This application is the U.S. National Phase under 35 U.S.C. § 371 of International Application PCT/JP2016/066141, filed Jun. 1, 2016, which claims priority to Japanese Patent Application No. 2015-150524, filed Jul. 30, 2015. The International Application was published under PCT Article 21(2) in a language other than English.

TECHNICAL FIELD

The present invention relates to a non-aqueous inkjet ink composition suitable for manufacturing large-size signboard ads, etc., whose printing side is primarily constituted by a vinyl chloride polymer or ethylene-vinyl acetate copolymer, as well as a printed matter obtained by using such ink composition.

BACKGROUND ART

A growing number of modern signboard ads feature vivid, sophisticated design logos and patterns, or images of products and human faces with photographic reality. In addition, a considerable number of signboards are now large in size, so that they can give strong impact on the viewers. General signboard production methods have been to cut letters out of colored sheets and attach them to generate logos, and to utilize various types of printing presses to create photographic images. As a result, signboard production has heretofore presented such problems as consuming a lot of time and labor, or requiring large-scale equipment such as a printing press.

Accordingly, there have been attempts to produce signboards featuring vivid images in a simpler way, by utilizing the inkjet method that permits printing of a design created on a personal computer directly onto a base material.

The inkjet method allows a wide range of base materials to be printed on, making it easy to print on both hard and soft material sheets such as papers, polymers and metals. Particularly when printing signboard ads that are installed outdoors and thus have a range of performance requirements including light weight, excellent strength and durability, resistance to rain, and affordable cost, the inkjet method presents a great advantage in that it makes it easy to print on polymer sheets that have these characteristics.

In addition, super-wide-format inkjet printers boasting a printing width of 2,000 mm or more are available of late and allowing large-size printed matter, which would otherwise require the traditional patchwork process, to be produced in one go. These printers, and other advancements, are making it even easier to produce signboards.

In general, tarpaulins are commonly used polymer sheets for signboard ads. For reference, a tarpaulin is a composite laminate sheet having a polyester or polyamide core material and whose top and bottom layers are each constituted by a polyvinyl chloride, ethylene-vinyl acetate copolymer, or other vinyl polymer.

Among the inkjet ink compositions printed on these composite sheets are non-aqueous inkjet ink compositions based on organic solvents (or more recently, environmentally-friendly organic solvents). Non-aqueous inkjet ink compositions require use of materials that offer good wettability, drying property, fixing property, etc., with respect to the polyvinyl chloride, ethylene-vinyl acetate copolymers, and other vinyl polymers traditionally used as surface materials for composite sheets.

Known methods to meet this requirement include: using an organic solvent constituted by an alkylene glycol monoether monoester and a cyclic ester (refer to Patent Literature 1); using a binder resin constituted by a vinyl polymer, as well as an organic solvent containing a specified quantity of an environmentally-friendly polyalkylene glycol dialkyl ether (refer to Patent Literature 2); and containing, as an organic solvent, a specified quantity of a diethylene glycol ethyl methyl ether and a specified quantity of a propylene carbonate (refer to Patent Literature 3).

However, in recent years there has been demand for higher printing speeds, and when traditional non-aqueous inkjet ink compositions (particularly non-aqueous inkjet ink compositions using environmentally-friendly organic solvents) are used for printing, the problems of insufficient filling of solid areas (hereinafter referred to as "solid fill property"), poor discharge stability, and mottling have arisen.

BACKGROUND ART LITERATURE

Patent Literature

Patent Literature 1: Japanese Patent Laid-open No. 2005-200469
Patent Literature 2: International Patent Laid-open No. WO2007/072804
Patent Literature 3: International Patent Laid-open No. WO2015/020128

SUMMARY OF THE INVENTION

Problems to be Solved by the Invention

An object of the present invention is to provide a non-aqueous inkjet ink composition offering excellent wettability, fixing property, solid fill property, anti-mottling property, discharge stability, and drying property, and a high flash point, even when printed at high speed on a matter to be printed whose printing side is constituted by a polyvinyl chloride, ethylene-vinyl acetate copolymer, or other vinyl polymer, etc.

Means for Solving the Problems

After studying in earnest to achieve the aforementioned object, the inventors of the present invention found that the object could be achieved by containing, as an organic solvent, a specified quantity of a diethylene glycol alkyl ether and a specified quantity of a propylene carbonate, and consequently arrived at the present invention as a solution.

To be specific, the present invention includes the following.

(1) A non-aqueous inkjet ink composition comprising an acrylic resin, a pigment, a pigment dispersant, and an organic solvent, the non-aqueous inkjet ink composition characterized by comprising, as the organic solvent, a propylene carbonate and a diethylene glycol dialkyl ether, wherein the propylene carbonate is compounded by 5 to 25 percent by mass in the ink composition, and the diethylene glycol dialkyl ether is compounded in a manner providing a ratio of diethylene glycol dialkyl ether/propylene carbonate in a range of 3.0 to 8.0.

(2) A non-aqueous inkjet ink composition according to (1), characterized in that the diethylene glycol dialkyl ether is a diethylene glycol ethyl methyl ether and/or diethylene glycol diethyl ether.

(3) A non-aqueous inkjet ink composition according to (1) or (2), characterized in that the acrylic resin is constituted by two or more types of acrylic resins.

(4) A non-aqueous inkjet ink composition according to any one of (1) to (3), characterized in that the acrylic resin contains acrylic resin (A) whose glass transition temperature is in a range of 90 to 110° C. and mass-averaged molecular weight is in a range of 20000 to 40000, and acrylic resin (B) whose glass transition temperature is in a range of 65 to 85° C. and mass-averaged molecular weight is in a range of 50000 to 80000, where the ratio of (A)/(B) is 70 to 90/10 to 30.

Effects of the Invention

The non-aqueous inkjet ink composition proposed by the present invention contains an acrylic resin, a pigment, a pigment dispersant, and, as an organic solvent, a specified quantity of a diethylene glycol dialkyl ether, and a specified quantity of a propylene carbonate.

This way, the ink composition demonstrates such effects as a sufficiently high flash point, excellent safety, absence of voids, good solid-fill property and anti-mottling property, and good discharge stability from the inkjet nozzle.

MODE FOR CARRYING OUT THE INVENTION (Acrylic Resin)

The acrylic resin that constitutes the non-aqueous inkjet ink composition proposed by the present invention may be a polymer of a (meth)acrylate soluble in an organic solvent, a copolymer thereof, or the like. Examples of such (meth) acrylates include ethyl, propyl, butyl (meth)acrylates and other alkyl (meth)acrylates; and hydroxy methyl, hydroxy ethyl, hydroxy propyl, hydroxy butyl, hydroxy pentyl (meth) acrylates, and other hydroxy alkyl (meth)acrylates, and the like.

Preferably such acrylic resin contains (A) an acrylic resin whose glass transition temperature is in a range of 90 to 110° C. and mass-averaged molecular weight is in a range of 20000 to 40000, and (B) an acrylic resin whose glass transition temperature is in a range of 65 to 85° C. and mass-averaged molecular weight is in a range of 50000 to 80000, where the ratio of (A)/(B) is 70 to 90/10 to 30.

Specific examples of acrylic resins that may be used include BR-60 (Tg: 75° C.), BR-64 (Tg: 55° C.), BR-75 (Tg: 90° C.), BR-77 (Tg: 80° C.), BR-83 (Tg: 105° C.), BR-87 (Tg: 105° C.), BR-88 (Tg: 105° C.), BR-90 (Tg: 65° C.), BR-93 (Tg: 50° C.), BR-95 (Tg: 80° C.), BR-105 (Tg: 50° C.), BR-106 (Tg: 50° C.), BR-107 (Tg: 50° C.), BR-108 (Tg: 90° C.), BR-113 (Tg: 75° C.), BR-115 (Tg: 50° C.), and BR-116 (Tg: 50° C.) by Mitsubishi Rayon, and the like.

The use quantity of the acrylic resin is in a range of 1.0 to 15.0 percent by mass, or preferably in a range of 1.0 to 10.0 percent by mass, or more preferably in a range of 1.0 to 7.0 percent by mass, relative to the total quantity of the non-aqueous inkjet ink composition.

If the total use quantity of the acrylic resin is less than 1 percent by mass, sufficient fixing property on the base material cannot be achieved; if the total use quantity exceeds 15.0 percent by mass, on the other hand, the solid content becomes excessive and the discharge stability drops.

It should be noted that combining resins other than the acrylic resins mentioned above, such as vinyl chloride resins, vinyl chloride-vinyl acetate resins, ethylene-vinyl acetate resins, styrene-acrylic resins, styrene-maleate resins, rosin resins, rosin ester resins, petroleum resins, coumarone indene resins, terpene phenol resins, phenol resins, urethane resins, melamine resins, urea resins, epoxy resins, cellulose resins, xylene resins, alkyd resins, aliphatic hydrocarbon resins, butyral resins, maleate resins, fumarate resins, etc., is also permitted, so long as the performance does not drop.

(Pigment)

For the pigment that constitutes the non-aqueous inkjet ink composition proposed by the present invention, any known inorganic pigment, organic pigment or other pigment traditionally used in non-aqueous inkjet ink compositions may be used.

Specific examples of known traditional inorganic pigments include carbon black, titanium oxide, zinc flower, zinc oxide, tripon, iron oxide, aluminum oxide, silicon dioxide, kaolinite, montmorillonite, talc, barium sulfate, calcium carbonate, silica, alumina, cadmium red, red iron oxide, molybdenum red, chrome vermillion, molybdate orange, yellow lead, chrome yellow, cadmium yellow, yellow iron oxide, titanium yellow, chromium oxide, viridian, cobalt green, titanium cobalt green, cobalt chrome green, sea blue, ultramarine blue, Prussian blue, cobalt blue, cerulean blue, manganese violet, cobalt violet, mica, and the like.

Specific examples of organic pigments include azo, azomethine, polyazo, phthalocyanine, quinacridone, anthraquinone, indigo, thioindigo, quinophthalone, benzimidazolone, isoindoline, isoindolinone, and other organic pigments, and on the color index chart, pigment black 7, pigment blue 15, 15:1, 15:3, 15:4, 15:6, 60, pigment green 7, 36, pigment red 9, 48, 49, 52, 53, 57, 97, 122, 149, 168, 177, 178, 179, 206, 207, 209, 242, 254, 255, pigment violet 19, 23, 29, 30, 37, 40, 50, pigment yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, pigment orange 36, 43, 51, 55, 59, 61, 71, 74 are specific examples, among others.

Any one of these types of pigments may be used alone or two or more types may be mixed, and the use quantity of such pigment(s) is in a range of 1.0 to 10.0 percent by mass, or preferably in a range of 2.0 to 7.0 percent by mass, relative to the total quantity of the non-aqueous inkjet ink composition. If the pigment use quantity is less than 1.0 percent by mass, the coloring power tends to be insufficient; if the use quantity is more than 10.0 percent by mass, on the other hand, the viscosity tends to rise and the fluidity of the ink drops.

(Pigment Dispersant)

Next, for the pigment dispersant that constitutes the non-aqueous inkjet ink composition proposed by the present invention, any ionic or nonionic surface-active agent, anionic, cationic or nonionic polymer compound, etc., may be used.

Among these, polymer compounds are preferred; for example, carbodiimide compounds, AJISPER (manufactured by Ajinomoto Fine Chemical), SOLSPERSE (manufactured by Lubrizol), DISPERBYK (manufactured by BYK) and EFKA (manufactured by EFKA Additives), as described in Japanese Patent Laid-open No. 2004-083872, International Patent Laid-open No. WO2003/076527, and International Patent Laid-open No. WO2004/000950, are preferred. Any one of these types of pigment dispersants may be used alone or two or more types may be mixed.

It should be noted that any of the aforementioned pigment dispersants may be selected as deemed appropriate according to the type of the pigment and the type of the organic solvent used.

(Organic Solvent)

For the organic solvent that constitutes the non-aqueous inkjet ink composition proposed by the present invention, a diethylene glycol dialkyl ether is used by 40.0 to 80.0 percent by mass in the non-aqueous inkjet ink composition, while a propylene carbonate is used by 5.0 to 25.0 percent by mass, or preferably, in the interest of improved drying property, by 10.0 to 20.0 percent by mass, or more preferably by 12.0 to 18.0 percent by mass, in the non-aqueous inkjet ink composition.

Furthermore, a diethylene glycol dialkyl ether must be used so that the ratio of diethylene glycol dialkyl ether/propylene carbonate falls in a range of 3 to 8, and favorably in a range of 3.5 to 5.5.

When a diethylene glycol dialkyl ether and a propylene carbonate are used at a ratio in this range, excellent wettability, fixing property, solid fill property, as well as discharge stability, can be achieved even at high printing speed.

In addition, an alkylene glycol derivative with a flash point of 50 to 150° C. may be used with, and in addition to, a diethylene glycol dialkyl ether, in order to adjust the drying property and further improve the anti-mottling property.

Examples of such alkylene glycol derivatives with a flash point of 50 to 150° C. include: ethylene glycol diethyl ether, ethylene glycol dimethyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, tetraethylene glycol dimethyl ether and other (poly)ethylene glycol dialkyl ethers; propylene glycol dimethyl ether, propylene glycol diethyl ether, dipropylene glycol dimethyl ether, dipropylene glycol diethyl ether, propylene glycol diethyl ether, tetraethylene glycol dimethyl ether and other (poly)propylene glycol dialkyl ether; propylene glycol monomethyl ether, propylene glycol monoethyl ether, propylene glycol monobutyl ether, dipropylene glycol monomethyl ether, dipropylene glycol monoethyl ether and other (poly)polypropylene glycol monoalkyl ether; propylene glycol monomethyl ether acetate, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate and other (poly)polypropylene glycol monoalkyl ether monoalkyl esters; ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether and other (poly)ethylene glycol monoethers; ethylene glycol monomethyl acetate, ethylene glycol monoethyl acetate, ethylene glycol monobutyl acetate, diethylene glycol monomethyl acetate, triethylene glycol monomethyl acetate, and other (poly)ethylene glycol monoesters; ethylene glycol diacetate, diethylene glycol diacetate, triethylene glycol diacetate and other (poly)ethylene glycol diesters; and ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, diethylene glycol propyl ether acetate, triethylene glycol monobutyl ether, triethylene glycol ethyl ether acetate, triethylene glycol butyl ether acetate, and other (poly)ethylene glycol monoether monoesters, among others.

Among the alkylene glycol derivatives with a flash point of 50 to 150° C., diethylene glycol ethyl methyl ether and diethylene glycol diethyl ether are preferred.

The content, in the non-aqueous inkjet ink composition, of an alkylene glycol derivative with a flash point of 50 to 150° C. is preferably 1.0 to 30.0 percent by mass, or more preferably 4.0 to 15.0 percent by mass.

In addition, preferably the total quantity of the organic solvent accounts for 80.0 to 98.0 percent by mass in all ink compositions. If the total quantity exceeds 98.0 percent by mass, the printability of the obtained ink drops; if the total quantity is less than 80.0 percent by mass, on the other hand, it induces a rise in the viscosity of the ink and consequently the discharge property of the ink from the nozzle tends to drop, which is not desirable.

(Other Components)

Furthermore, various additives, such as surface-active agent, plasticizer, surface conditioner, ultraviolet protectant, photostabilizer, and antioxidant, may be used in the non-aqueous inkjet ink composition proposed by the present invention, as necessary.

(Manufacturing of Non-Aqueous Inkjet Ink Composition)

Next, a method to manufacture the non-aqueous inkjet ink composition proposed by the present invention, using the aforementioned materials, is explained.

The non-aqueous inkjet ink composition proposed by the present invention may be obtained by, for example, dispersing and mixing the materials using a wet circulation mill, bead mill, ball mill, sand mill, attritor, roll mill, DCP mill, agitator, Henschel mixer, colloid mill, ultrasonic homogenizer, high-pressure homogenizer (microfluidizer, nanomizer, ultimizer, Genus PY, DeBEE 2000, etc.), pearl mill, or other dispersion machine, thereby adjusting the viscosity of the non-aqueous inkjet ink composition to a range of 2 to 10 mPa·s.

Preferably the content of all organic solvent in the non-aqueous inkjet ink composition proposed by the present invention, which is the amount obtained by subtracting the total quantity of the binder resin, pigment, pigment dispersant, and other additives used as necessary, from the total quantity of the ink composition, is modified as deemed appropriate so that the viscosity of the ink falls in the aforementioned range.

The non-aqueous inkjet ink composition proposed by the present invention, as obtained above, can be used on base materials whose surface layer, at least, is constituted by a vinyl chloride polymer or ethylene-vinyl acetate copolymer, with the non-aqueous inkjet ink composition applied using an inkjet printer.

(Applications)

While the non-aqueous inkjet ink composition proposed by the present invention can be used in known applications, it is particularly suitable when used on the surface layers whose base material is a nonabsorbent material. Nonabsorbent materials include metals, resins, ceramics, and the like, but in the interest of printability such as solid-fill property and solid printing, preferably the present invention is used on surface layers whose base material is a resin, or on surface layers where this resin is a vinyl chloride polymer or ethylene-vinyl acetate copolymer.

EXAMPLES

The present invention is explained in greater detail below using examples; however, the present invention is not limited to these examples. It should be noted that, unless otherwise specified, "%" refers to "percent by mass," while "part" refers to part by mass.

The following materials were used in the examples and comparative examples explained below.

<Pigment Dispersants>
SOLSPERSE 39000 (manufactured by Lubrizol)
SOLSPERSE 56000 (manufactured by Lubrizol)
PB822: AJISPER PB822 (manufactured by Ajinomoto Fine Chemical)

<Pigments>
MA70: Carbon Black MA70 (manufactured by Mitsubishi Chemical)
D7110F: HELIOGEN Blue D7110F (manufactured by BASF)
4G01: NOVOPERM Yellow 4G01 (manufactured by Clariant)
RGT: FASTOGEN Super Magenta RGT (manufactured by DIC)

<Vinyl Chloride/Vinyl Acetate Resins>
E15/45: VINNOL E15/45 (manufactured by Wacker Chemie AG)

<Acrylic Resins>
BR-83: DIANAL BR-83 (manufactured by Mitsubishi Rayon, glass transition temperature 105° C., mass-averaged molecular weight 40,000)
BR-87: DIANAL BR-87 (manufactured by Mitsubishi Rayon, glass transition temperature 105° C., mass-averaged molecular weight 25,000)
BR-60: DIANAL BR-60 (manufactured by Mitsubishi Rayon, glass transition temperature 75° C., mass-averaged molecular weight 70,000)
BR-77: DIANAL BR-77 (manufactured by Mitsubishi Rayon, glass transition temperature 80° C., mass-averaged molecular weight 65,000)

Examples 1 to 12 and Comparative Examples 1 to 4

(Manufacturing of Base Inks of Various Colors)
<Manufacturing of Black Base Non-Aqueous Inkjet Ink>
Ten parts of a pigment dispersant (SOLSPERSE 39000) were dissolved in 65 parts of a diethylene glycol diethyl ether, into which 25 parts of a pigment (MA70) were mixed under agitation and then the mixture was kneaded using a bead mill, to obtain a black base non-aqueous inkjet ink.

<Manufacturing of Cyan Base Non-Aqueous Inkjet Ink>
Ten parts of a pigment dispersant (SOLSPERSE 56000) were dissolved in 65 parts of a diethylene glycol diethyl ether, into which 25 parts of a pigment (D7110F) were mixed under agitation and then the mixture was kneaded using a bead mill, to obtain a cyan base non-aqueous inkjet ink.

<Manufacturing of Yellow Base Non-Aqueous Inkjet Ink>
Ten parts of a pigment dispersant (PB822) were dissolved in 65 parts of a diethylene glycol diethyl ether, into which 25 parts of a pigment (4G01) were mixed under agitation and then the mixture was kneaded using a bead mill, to obtain a yellow base non-aqueous inkjet ink.

<Manufacturing of Magenta Base Non-Aqueous Inkjet Ink>
Ten parts of a pigment dispersant (PB822) were dissolved in 65 parts of a diethylene glycol diethyl ether, into which 25 parts of a pigment (RGT) were mixed under agitation and then the mixture was kneaded using a bead mill, to obtain a magenta base non-aqueous inkjet ink.

<Manufacturing of Non-Aqueous Inkjet Ink Composition>
The materials were mixed under agitation according to the blends (the blending ratios of the materials are based on percent by mass) in Table 1, to obtain the non-aqueous inkjet ink compositions in Examples 1 to 12 and Comparative Examples 1 to 4.

<Printing Method and Printed Matters>
Using a commercial inkjet printer loaded with each of the non-aqueous inkjet ink compositions in Examples 1 to 12 and Comparative Examples 1 to 4, solid printing was performed onto a polyvinyl chloride sheet in a high-speed printing mode, to obtain the printed matter in Examples 1 to 12 and Comparative Examples 1 to 4.

<Evaluations>
The printed matter using the non-aqueous inkjet ink compositions in Examples 1 to 12 and Comparative Examples 1 to 4 were evaluated for the characteristics below. In the following evaluations, A and B indicate that the ink can be used in practical applications, while C and D indicate that using the ink as a commercial product presents difficulty.

(Viscosity)
The viscosity of each of the non-aqueous inkjet ink compositions in Examples 1 to 12 and Comparative Examples 1 to 4 was measured at 25° C. using a viscometer (RE100L manufactured by Toki Sangyo).

(Drying Property 1 of Printed Matter)
Using a commercial inkjet printer loaded with each of the non-aqueous inkjet ink compositions in Examples 1 to 12 and Comparative Examples 1 to 4, solid printing was performed onto a polyvinyl chloride sheet (product name: MD5, manufactured by METAMARK) in a high-speed printing mode, and the printed sheet was rolled and let stand for 1 day at 25° C., after which the printed sheet was unrolled and the drying property was evaluated by visually checking if non-printed areas that were in contact with printed areas were smudged. The drying property was judged according to the evaluation standards below.

Evaluation Standards
A: The non-printed areas in contact with the printed areas are not smudged.
B: The non-printed areas in contact with the printed areas are slightly smudged.
C: The non-printed areas in contact with the printed areas are very smudged.

(Drying Property 2 of Printed Matter)
Using a commercial inkjet printer loaded with each of the non-aqueous inkjet ink compositions in Examples 1 to 12 and Comparative Examples 1 to 4, solid printing was performed onto a polyvinyl chloride sheet (product name: MD5, manufactured by METAMARK) in a standard mode, and the printed sheet was let stand for 3 minutes at 25° C., after which another polyvinyl chloride sheet was put on top of the printed sheet with its back side touching the printed surface, and the layered sheets were tested using an ink set tester (manufactured by Toyo Seiki) to determine, based on visual evaluation, whether the back side of the polyvinyl chloride sheet was smudged. The drying property was judged according to the evaluation standards below.

Evaluation Standards
A: The back side of the polyvinyl chloride sheet is not smudged.
B: The back side of the polyvinyl chloride sheet is slightly smudged.
C: The back side of the polyvinyl chloride sheet is very smudged.

(Solid Fill Property)

Using each of the non-aqueous inkjet ink compositions in Examples 1 to 12 and Comparative Examples 1 to 4, solid printing was performed in a high-speed printing mode onto a polyvinyl chloride sheet (product name: Kapjet Gloss Banner, manufactured by Filmolux), and the filling of solid areas was visually evaluated based on whether or not the images had voids, i.e., solid areas were filled properly.

Evaluation Standards
A: There are no voids.
B: There are some voids.
C: There are many voids.

(Anti-Mottling Property)

Using each of the non-aqueous inkjet ink compositions in Examples 1 to 12 and Comparative Examples 1 to 4, mixed-color (red, blue, green) solid printing was performed in a standard mode onto a polyvinyl chloride sheet (product name: Kapjet Gloss Banner, manufactured by Filmolux), and the images were visually evaluated for mottling (mottled appearances) or absence thereof.

Evaluation Standards
A: There is no mottling.
B: There is some mottling.
C: There is considerable mottling.

(Discharge Stability)

Using each of the non-aqueous inkjet ink compositions in Examples 1 to 12 and Comparative Examples 1 to 4, polyvinyl chloride sheets (product name: MD5, manufactured by METAMARK) were printed and the number of sheets showing unprinted areas was counted for evaluation of discharge stability.

Evaluation Standards
A: Unprinted areas show up on or after the 71st sheet, or no unprinted areas show up on the first 100 sheets.
B: Unprinted areas show up on the 51st through 70th sheets.
C: Unprinted areas show up on the 31st through 50th sheets.
D: Unprinted areas show up on the first 30 sheets.

TABLE 1

| | | Example | | | | | | | |
|---|---|---|---|---|---|---|---|---|---|
| | | 1 Yellow | 2 Yellow | 3 Yellow | 4 Yellow | 5 Yellow | 6 Yellow | 7 Yellow | 8 Yellow |
| Pigment | 4G01 | 3.00% | 3.00% | 3.00% | 3.00% | 3.00% | 3.00% | 3.00% | 3.00% |
| | RGT | | | | | | | | |
| | D7110F | | | | | | | | |
| | MA70 | | | | | | | | |
| Pigment dispersant | PB822 | 1.20% | 1.20% | 1.20% | 1.20% | 1.20% | 1.20% | 1.20% | 1.20% |
| | SOLSPERSE 56000 | | | | | | | | |
| | SOLSPERSE 39000 | | | | | | | | |
| Vinyl chloride-vinyl acetate resin | E15/45 | | | | | | | | |
| Acrylic resin | BR-83 (Tg = 105° C., Mw = 40,000) | 3.00% | 3.00% | 3.00% | 3.00% | 3.00% | 3.00% | | 3.00% |
| | BR-87 (Tg = 105° C., Mw = 25,000) | | | | | | | 3.00% | |
| | BR-60 (Tg = 75° C., Mw = 70,000) | 0.60% | 0.90% | 0.45% | 0.60% | 0.60% | 0.60% | 0.70% | |
| | BR-77 (Tg = 80° C., Mw = 65,000) | | | | | | | | 1.00% |
| Organic solvent | Diethylene glycol diethyl ether | 57.20% | 59.90% | 52.35% | 42.20% | 42.20% | 42.20% | 57.10% | 58.80% |
| | Diethylene glycol ethyl methyl ether | 20.00% | 20.00% | 20.00% | 20.00% | 20.00% | 20.00% | 20.00% | 20.00% |
| | Propylene carbonate | 15.00% | 12.00% | 20.00% | 15.00% | 15.00% | 15.00% | 15.00% | 15.00% |
| | Diethylene glycol ethyl ether acetate | | | | 15.00% | | | | |
| | Dipropylene glycol monomethyl ether | | | | | 15.00% | | | |
| | Dipropylene glycol methyl ether acetate | | | | | | 15.00% | | |
| | Total | 100.00% | 100.00% | 100.00% | 100.00% | 100.00% | 100.00% | 100.00% | 100.00% |
| | Diethylene glycol dialkyl ether/propylene carbonate | 5.1 | 6.7 | 3.6 | 4.1 | 4.1 | 4.1 | 5.1 | 5.1 |
| | Viscosity (mPa · s) | 4.2 | 4.2 | 4.3 | 3.9 | 4.2 | 4.2 | 4.0 | 4.1 |
| | Flash point | 71° C. $_{above}$ or | 71° C. $_{above}$ or | 71° C. $_{above}$ or | 71° C. $_{above}$ or | 71° C. $_{above}$ or | 71° C. $_{above}$ or | 71° C. $_{above}$ or | 71° C. $_{above}$ or |
| | Drying property 1 | A | A | A | A | A | A | A | A |
| | Drying property 2 | A | A | A | A | A | A | A | A |
| | Solid fill property | A | A | A | A | A | A | A | A |
| | Anti-mottling property | A | A | A | A | A | A | A | A |
| | Discharge stability | A | A | A | A | A | A | A | A |

TABLE 2

|  |  | Example | | | | Comparative Example | | | |
| --- | --- | --- | --- | --- | --- | --- | --- | --- | --- |
|  |  | 9 Yellow | 10 Magenta | 11 Cyan | 12 Black | 1 Yellow | 2 Yellow | 3 Yellow | 4 Yellow |
| Pigment | 4G01 | 3.00% |  |  |  | 3.00% | 3.00% | 3.00% | 3.00% |
|  | RGT |  | 3.00% |  |  |  |  |  |  |
|  | D7110F |  |  | 3.00% |  |  |  |  |  |
|  | MA70 |  |  |  | 3.50% |  |  |  |  |
| Pigment dispersant | PB822 | 1.20% | 1.50% |  |  | 1.20% | 1.20% | 1.20% | 1.20% |
|  | SOLSPERSE 56000 |  |  | 0.60% |  |  |  |  |  |
|  | SOLSPERSE 39000 |  |  |  | 0.88% |  |  |  |  |
| Vinyl chloride-vinyl acetate resin | E15/45 | 0.60% |  |  |  |  |  |  |  |
| Acrylic resin | BR-83 (Tg = 105° C., Mw = 40,000) | 2.50% | 3.00% | 3.00% | 3.10% | 3.20% | 2.00% | 2.80% | 3.00% |
|  | BR-87 (Tg = 105° C., Mw = 25,000) |  |  |  |  |  |  |  |  |
|  | BR-60 (Tg = 75° C., Mw = 70,000) | 0.30% | 0.60% | 0.60% | 0.65% | 0.60% | 0.60% | 0.60% | 0.60% |
|  | BR-77 (Tg = 80° C., Mw = 65,000) |  |  |  |  |  |  |  |  |
| Organic solvent | Diethylene glycol diethyl ether | 57.40% | 56.90% | 57.80% | 57.02% | 70.00% | 33.20% | 22.40% | 65.20% |
|  | Diethylene glycol ethyl methyl ether | 20.00% | 20.00% | 20.00% | 20.00% | 20.00% | 20.00% | 20.00% | 20.00% |
|  | Propylene carbonate | 15.00% | 15.00% | 15.00% | 15.00% | 2.00% | 40.00% | 20.00% | 7.00% |
|  | Diethylene glycol ethyl ether acetate |  |  |  |  |  |  | 30.00% |  |
|  | Dipropylene glycol monomethyl ether |  |  |  |  |  |  |  |  |
|  | Dipropylene glycol methyl ether acetate |  |  |  |  |  |  |  |  |
|  | Total | 100.00% | 100.00% | 100.00% | 100.15% | 100.00% | 100.00% | 100.00% | 100.00% |
| Diethylene glycol dialkyl ether/propylene carbonate | | 5.2 | 5.1 | 5.2 | 5.1 | 45.0 | 1.3 | 2.1 | 12.2 |
| Viscosity (mPa · s) | | 4.3 | 4.3 | 4.0 | 4.1 | 4.0 | 4.3 | 4.0 | 4.1 |
| Flash point | | 71° C. above or | 71° C. above or | 71° C. above or | 71° C. above or | 71° C. above or | 71° C. above or | 71° C. above or | 71° C. above or |
| Drying property 1 | | A | A | A | A | A | C | B | A |
| Drying property 2 | | A | A | A | A | A | C | B | A |
| Solid fill property | | A | A | A | A | A | B | B | A |
| Anti-mottling property | | A | A | A | A | A | D | C | A |
| Discharge stability | | A | A | A | A | C | A | A | C |

According to the results of Examples 1 to 12 shown in Table 1, the non-aqueous inkjet ink compositions conforming to the composition proposed by the present invention had appropriate ink composition viscosity for inkjet printing. In addition, these inks exhibited excellent drying property, solid-fill property, anti-mottling property and discharge stability. In comparison, discharge stability was poor in Comparative Example 1 characterized by a low propylene carbonate content of 2.00%, and in Comparative Example 4 characterized by a high diethylene glycol dialkyl ether/propylene carbonate ratio of 12.2. Also, Comparative Example 2 characterized by a high propylene carbonate content of 40.00%, and Comparative Example 3 characterized by a low diethylene glycol dialkyl ether/propylene carbonate ratio of 2.1, resulted in poor drying property 1, drying property 2, solid-fill property, and anti-mottling property.

What is claimed is:

1. A non-aqueous inkjet ink composition comprising an acrylic resin, a pigment, a pigment dispersant, and an organic solvent, the non-aqueous inkjet ink composition characterized by comprising, as the organic solvent, a propylene carbonate and a diethylene glycol dialkyl ether, wherein:

the acrylic resin contains acrylic resin (A) whose glass transition temperature is in a range of 90 to 110° C. and mass-averaged molecular weight is in a range of 20000 to 40000, and acrylic resin (B) whose glass transition temperature is in a range of 65 to 85° C. and mass-averaged molecular weight is in a range of 50000 to 80000, where a ratio of (A)/(B) is 70 to 90/10 to 30, and the propylene carbonate is compounded by 5 to 25 percent by mass in the ink composition, and the diethylene glycol dialkyl ether is compounded in a manner providing a ratio of diethylene glycol dialkyl ether/propylene carbonate in a range of 3.0 to 8.0.

2. The non-aqueous inkjet ink composition according to claim 1, characterized in that the diethylene glycol dialkyl ether is a diethylene glycol ethyl methyl ether and/or diethylene glycol diethyl ether.

* * * * *